United States Patent

Breton et al.

[11] 4,042,747
[45] Aug. 16, 1977

[54] GASKET AND SEALING STRUCTURES OF FILLED POLYTETRAFLUOROETHYLENE RESINS

[75] Inventors: Ernest J. Breton, Wilmington; Dexter Worden, Newark; Melville E. Pugh, Jr., Wilmington, all of Del.

[73] Assignees: Joseph A. Teti, Jr.; William C. Teti, both of Philadelphia, Pa. ; part interest to each

[21] Appl. No.: 558,344

[22] Filed: Mar. 14, 1975

[51] Int. Cl.² ........................ B32B 5/16; B32B 27/00
[52] U.S. Cl. .................................... 428/323; 428/325; 428/328; 428/331; 428/308; 428/309; 428/317; 428/402; 428/422; 264/44; 264/59; 264/122; 264/127; 260/33.6 F; 260/42.47; 260/900
[58] Field of Search ............... 428/308, 309, 317, 325, 428/328, 329, 331, 402, 403, 404, 421, 422, 323; 264/44, 59, 122, 127; 75/211, 212; 260/900, 33.6 F, 42.47

[56] References Cited

U.S. PATENT DOCUMENTS

| | | | |
|---|---|---|---|
| 2,752,321 | 6/1956 | Heller | 260/33.6 F |
| 3,315,020 | 4/1967 | Gore | 264/127 |
| 3,407,249 | 10/1968 | Landi | 428/421 |
| 3,556,161 | 1/1971 | Roberts | 264/127 |
| 3,678,145 | 7/1972 | Boes | 264/127 |
| 3,864,124 | 2/1975 | Breton et al. | 264/59 |

FOREIGN PATENT DOCUMENTS 1,554,879  2/1971  Germany

Primary Examiner—George F. Lesmes
Assistant Examiner—William R. Dixon, Jr.
Attorney, Agent, or Firm—Connolly and Hutz

[57] ABSTRACT

Disclosed are gasket and seal materials comprising particulate material interconnected and entrapped by fibrillated polytetrafluoroethylene and methods for manufacturing and using them.

6 Claims, 4 Drawing Figures 4,042,747

GASKET AND SEALING STRUCTURES OF FILLED POLYTETRAFLUOROETHYLENE RESINS

BACKGROUND OF THE INVENTION

Gaskets and seals perform the primary function of preventing the flow of fluids past moving or stationary mechanical interfaces. Gaskets are normally employed with stationary interfaces. The normal requirements for gaskets as set forth in the *Handbook of Mechanical Packings and Gasket Materials* published by the Mechanical Packing Association, New York, New York, include mainly low creep, resistance to chemical attack and conformability. While many gasket materials are available, none has been developed that satisfies all of these requirements to the degree that is desired in commercial practice. It is particularly difficult to combine low creep and high conformability. Elastomeric materials that conform well to rough surfaces, tend to creep under high pressures. Metal gaskets, in the other extreme, resist high pressure creep, but have poor conformability. Also, they are very susceptible to corrosion.

Seals commonly prevent the flow of fluids past sliding mechanical interfaces, such as rotating shapes, and have additional requirements over and above those of gaskets. Seals must have resistance to wear and must possess a low coefficient of friction. Another requirement in many seal applications is porosity which is essential to retain fluid lubricants. In such applications there is the need to retain this porosity under compression. Of the many seal materials available, including packing materials, none satisfactorily meets all requirements desired in commercial practice.

OBJECTS OF THE INVENTION

It is the primary object of this invention to provide a composite system useful both for gaskets and seals which can be adjusted to provide for desired combinations of resistance to creep, resistance to chemical attack, good conformability resistance to high temperature flow, and flexibility. A further object of the invention is to provide a unique method of making such composite systems. Another object of the present invention is a method of sealing and gasketing by the use of the novel structures of the present invention.

BRIEF DESCRIPTION OF THE INVENTION

Gaskets and seals of this invention are composite structures in which particulate materials are interconnected and intertwined with fibrils of polytetrafluoroethylene. The amount, size and composition of the particulate materials employed in the present invention may be selected to give desired combinations of properties for gasket and/or seal applications. The gasket and seal structures according to the invention include a fluid medium of specified viscosity commonly either a lubricating grease or a liquid which can set to produce a stronger product. Gaskets and seals as defined are applied to mechanical interfaces by conforming the structures to the surface and then compressing the structure while it is in place.

DETAILED DESCRIPTION OF THE INVENTION

Figure 1:
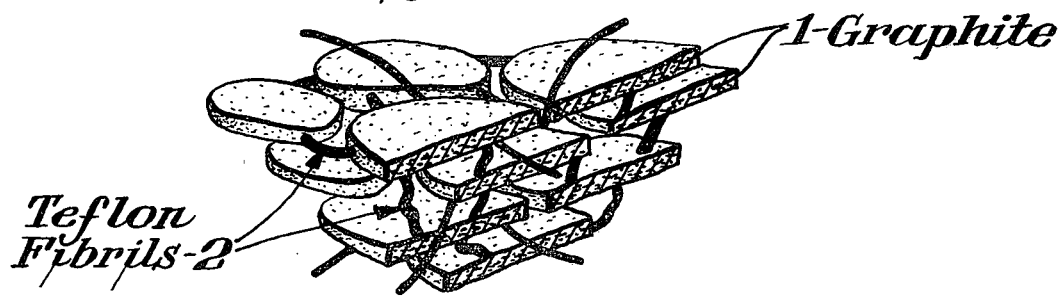
FIG. 1 is a cross-sectional view of a gasket or seal structure having particulate material of platelette structure in the uncompressed state showing particulate material such as flake graphite 1 interconnected and intertwined with fibrils of polytetrafluoroethylene 2.
Figure 2:
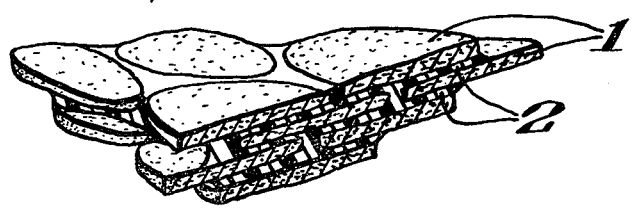
FIG. 2 is a cross-sectional view of the same structure as shown in FIG. 1 but in a compressed state illustrating how particles 1 consolidate to form a denser structure.
Figure 3:
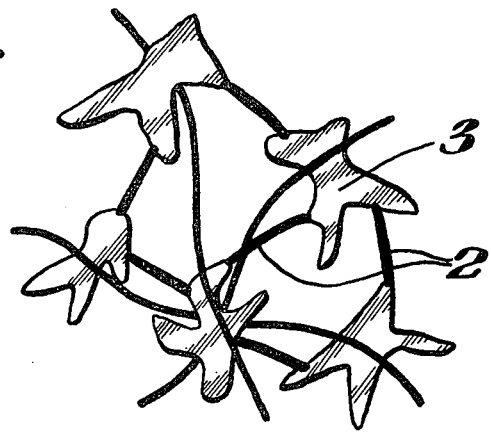
FIG. 3 is a cross-sectional view of an interlocking structure according to the invention in the uncompressed state wherein dendritic particles 3 are employed.
Figure 4:
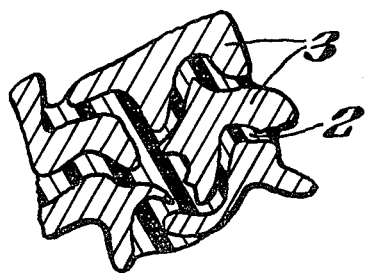
FIG. 4 is a cross-sectional view of the structure of FIG. 3 in a compressed state in which particulate material 3 has interlocked to form a structure that is highly resistant to creep.

The structures of this invention are uniquely suited for use as gaskets and seals. In their uncompressed state, as illustrated in FIGS. 1 and 3, the structures are very flexible and compliant. This properly enables them to conform to irregular or mismatched surfaces. When compressed, as shown in FIGS. 2 and 4, the particulate material interlocks. Interlocking can be enhanced by using irregularly shaped particles 3 as shown in FIGS. 3 and 4. Such a structure is extremely resistant to flow or creep under compression. Through the selection of materials, particles can be made to contact each other and effect particle-to-particle bonds which further enhance resistance to creep, which is essential in gaskets used at high temperatures and pressures. The gasket and seal materials are normally in the form of sheets but may also be in the form of rods, squares or other objects.

When porosity is desired to hold lubricants for the sealing of sliding surfaces, the ratio of particulate material to polytetrafluoroethylene (hereafter PTFE) can be increased to the point where there is insufficient PTFE to fill spaces between compressed particles 1 and 3. Under these circumstances, void spaces will be retained even when the sealing material is compressed. The ratio of particulate material to PTFE can be adjusted to give the desired levels of porosity needed for lubrication. In this manner, the seals of this invention are pliable in their uncompressed state for conforming to mating surfaces, yet resist creep when comressed because the particles interlock but still remain porous to retain lubricant.

The amount of PTFE used to manipulate the properties of the structures of this invention varies between about 5 and about 35 volume percent depending upon the total volume of solids percent, although concentration beyond these limits can be used for special effects. In general, going above 35 volume percent PTFE reduces the amount of interlocking filler material during compression unless large dendritic particles are used. For maximum resistance to creep in high pressure gasket applications, the preferred range of PTFE is between 8 and 17 volume percent. This allows particles to come close enough together to permit unencumbered interlocking. For seal applications requiring higher tensile strength and low coefficients of friction, the preferred range of PTFE is from 18 to 35 volume percent.

The preferred material for forming fibrils to bond particulate material together as shown in FIGS. 1 and 3 is fibrillatable PTFE of the type designated Teflon 6C manufactured by E. I. DuPont de Nemours & Co. Any polymeric material that can be fibrillated by random mechanical shearing can be used. Besides having the property of being fibrillatable, PTFE is very resistant to chemical attack and can be used up to 450° F. The preparation of PTFE is well known and is illustrated by U.S. Pat. Nos. 2,510,112, 2,587,357 and 2,685,707. Typical particle size of the PTFE useful in the present invention ranges from about 50 to about 560 microns although larger or smaller particles are useful under certain circumstances.

The selection of a specific particulate material is based upon service requirements. When low friction is required, dry lubricants such as flake graphite as depicted in FIGS. 1 and 2 or molybdenum disulfide can be used. Typically, the dry lubricant particles are between 10 and 44 microns over their major axes, though larger and smaller particles can be used.

Alternatively low friction bearing materials in particulate form can be used. Included in this class of materials are the lead and copper base alloys or lead and copper alone.

Other particulate materials can be employed including the general class of metals, intermetallic compounds, ceramics salts and plastics. Mixtures of one or more of such particulate materials can be used for special effects. Generally, the specific particulate material will be chosen for the use intended keeping in mind that particulate materials which are very hard may cause excessive wear where moving surfaces are to be sealed.

This selection of particulate material thus depends upon the combination of friction and resistance to chemical attack that is needed and low friction materials are preferred for sealing applications. Graphite is more resistant to chemical attack than the metal base filler materials.

When greater resistance to creep or mechanical shear under compression is needed equiaxial particles such as ground artificial graphite, ground ceramics or metal powders can be used. Dendritic particles such as shown in FIGS. 3 and 4 are available in stainless steel, iron and other metal or glass powders made by atomization of molten materials. Electrolytic metals also are dentritic. For very small dentritic powders carbonyl nickel can be used.

Particle sizes of particulate materials useful in the present invention may range from about 0.1 to 200 microns although larger and smaller particle sizes are possible.

To promote particle-to-particle bonding under compression, soft metal particles that readily cold weld such as copper, nickel, aluminum and lead or alloys thereof can be used. Under the forces and movement generated during compression, particulate filler materials come into moving contact which effects bonding, thereby rigidizing the structure.

Dendritic particles of the type shown in FIGS. 3 and 4 have the further advantage that they impart elasticity to the compressed structure. This is needed in gaskets to accommodate changes of the distance between surfaces that are confining the gasket. Under these circumstances dendritic material made from atomized alloys, such as spring steels or bronzes, are used.

Increased elasticity and additional resistance to creep and wear can be obtained by incorporating fibers of metals, plastics, graphite or glass into the structure along with the PTFE and other filler material. Fibers can be from 1/16 inch up to ½ inch long or more with a length-to-diameter ratio of over 4 to 1. The fiber content can comprise from 0 to 100% of the filler content.

In another embodiment of the present invention, it was discovered that when a grease was incorporated into the seal and gasket materials of this invention, a very plastic, slippery PTFE base structure was produced. The presence of the grease uniformly distributed in the voids of the structures shown in FIGS. 1 and 3 caused the structure to be extremely flowable under compressive stress. Such a property is particularly useful in gaskets requiring exceptionally high degrees of conformability in order fully to occupy the void space between two surfaces to be sealed.

The liquid lubricant (e.g., grease) filled structure of this invention also has exceptional lubricating properties, falling in between those of dry lubricants and greases. This property makes it useful for seals requiring a high degree of lubricity and also for lubricating bearings.

The grease content in the structure was found to be effective between about 0.1 to about 60 volume percent. At amounts of about 40 to 60 volume percent, a maximization of fibrillation of PTFE during production is achieved whereas at lower volume percentages, for example 3 to 30%, flowability of the seal and gasket material under compression is improved although the extent of fibrillation enhancement will be less than at the higher percentages.

Fluid lubricants which are essentially semi-solids yet flow under stress at the temperatures involved, preferably greases, useful in the present invention, have a viscosity falling within the range of about 0.5 to about 1,000 poises and preferably between about 10 to about 200 at temperatures between about 10° and 150° C.

Incorporation of the fluid lubricant uniformly within the structures of the present invention is accomplished by admixing the fluid lubricant with the particulate material and PTFE during the mechanical working step. Except for the presence of the fluid lubricant along with the PTFE and particulate material, mechanical working to obtain fibrillation is carried out in the same manner as described in U.S. Pat. No. 3,864,124. In this connection, it was found that when lubricants of the specified viscosity are included with the particulate material and PTFE during the working step, processing is made easier and higher amounts of PTFE can be utilized, while still obtaining the fibrillation essential to a flexible structure with good green strength, than is possible in the process of aforesaid U.S. Pat. No. 3,864,124.

This effect was quite surprising because the process of U.S. Pat. No. 3,864,124 was found effective, with relatively low volume amounts of PTFE, in the substantial absence of liquid lubricants. The process of U.S. Pat. No. 3,864,124 is in turn contrasted with the earlier processes described in U.S. Pat. Nos. 3,556,161 and 3,281,511 wherein a lamellae structure was obtained which mechanically entrapped particulate material. This earlier process utilized liquids of low viscosity such as kerosene during processing whereas in the present invention, fluid lubricants of substantially higher viscosity are employed.

While it is not entirely understood, and applicants do not mean to be bound thereby, it is believed that the relatively high viscosity, semi-solid, fluid lubricants when present during the working step of the present invention actually aid in the fibrillation of the PTFE. This is in contrast to the low viscosity liquids suggested in U.S. Pat. Nos. 3,556,161 and 3,281,511 which result in a lamellae structure, rather than a fibrillated structure, apparently due to interference with the fibrillation effect. The enhancing of the fibrillation effect when using relatively high viscosity lubricants in accord with the present invention permits an easier working while at the same time allowing the use of higher amounts of PTFE than in said U.S. Pat. 3,864,124 and yet the desired fibrillated structure which is needed for good strength, pliability and cloth-like character is still obtained.

Fluid lubricants of the specified viscosity useful in the present invention are preferably greases of the type well known in the art for lubricating purposes. Such fluid lubricants normally comprise a synthetic, mineral, animal or vegetable oil having the desired viscosity per se or more commonly are greases containing a thickening agent such as a metallic soap to obtain the desired viscosity. Typical oils include petroleum or mineral oils, polyglycols (e.g., polyethylene and polypropylene glycols), phosphate esters, chlorinated or fluorinated hydrocarbons (e.g., chlorinated biphenyls), dioctyl sebacate, diethyl hexyl azelate, silicate esters and the like. Thickening agents, present in an amount sufficient to achieve the desired viscosity (e.g., 0.5–20 percent by weight) include lithium, calcium and sodium soaps, lime, silica and other thickening agents well known in the art such as polymer particles insoluble in the oil employed.

Although structures according to the present invention having the fluid lubricant present within the structure form very useful sealing and gasketing materials, particularly where sliding surfaces are involved, it is also possible to extract the fluid lubricant from the resulting structure after fibrillation has occurred, followed if necessary by compressing the structure such as by rolling to achieve the desired thickness. By this method, a final product is obtained which has a higher degree of compressibility because the presence of the fluid lubricant during working minimizes interlocking of the particulate material. Moreover, the fluid lubricant also increases the amount of fibrillation so that the resulting structure after extraction has a greater number of intertwined fibrils which interconnect and entrap the particulate material than is obtained when fluid lubricant is not present during the working step. Such fibrils include those which interconnect particles, that is, are adhered to two or more particles as well as those which entrap particles, that is, wind over and around particles without necessarily adhering to any particles. It is possible to utilize relatively high amounts of fluid lubricant during initial processing, for example 40 to 60 volume percent, to maximize fibrillation, and then to extract some but not all of the fluid lubricant to reduce the amount present in the final product to about 3 to 30 volume percent so that flowability under compression is retained.

Extraction of all or part of the fluid lubricant can be achieved by any suitable means such as by the use of well-known solvents for the particular lubricant employed. Illustrative solvents include petroleum hydrocarbons such as kerosene, naptha gasoline and related fractions, toluene, benzene, hexane, etc. as well as chlorinated hydrocarbons such as carbon tetrachloride, methylene chloride, and the like. Other solvents include alcohols (methanol, ethanol, isopropanol), ketones (acetone, methylethyl ketone), aldehydes (acetaldehyde) and the like. The specific choice of solvent will, of course, depend upon the particular fluid lubricant to be extracted or dissolved from the fibrillated structure.

To effect a stiffening of the final structure in situ liquids whose viscosity falls within the above limits and are capable of setting up due to evaporation or polymerization can be used in place of or in addition to the fluid lubricants. Included in this embodiment of the invention are epoxies, acrylates, silicates, etc. The stiffening liquids may be in the form of a monomer mixture which polymerized after fibrillation, a polymer which either cross-links or stiffens by solvent or dispersing medium removal after fibrillation, an inorganic stiffening agent such as a silicate which stiffens by chemical reaction or evaporation of solvent or dispersing medium, or any other of the well-known mixtures which can be stiffened. Thickening agents can be employed to obtain the desired viscosity.

Stiffening in situ augments interlocking of particles in increasing the resistance of seals and gaskets to creep after they have conformed to close the space to be sealed.

As stated earlier, the preferred method that can be used to make the gasket and seal materials of this invention is described in U.S. Pat. No. 3,864,124 issued Feb. 4, 1975. It entails mechanically working measured quantities of PTFE and filler materials to obtain a uniform dispersion, with or without the presence of a fluid medium having the stated viscosity. The mixture may then be hot rolled several times with folding of the powders to double the thickness between each rolling step. Temperatures between 60° C. to 150° C. are adequate. After the powders become coherent due to fibrillation of the PTFE, the resultant sheet is rolled in the following manner 4 to 10 more times or more to develop the desired level of strength:

After each pass, the sheet is folded upon itself to form two layers. This is rotated 90° and rerolled. In this manner the PTFE is fibrillated in orthogonal directions. Fibrils typically have a ratio of length to diameter of 10 to 1 to 100 to 1 or greater.

After the sheet is rolled to desired thickness, which can vary from 0.002 up to 0.25 inches, it is cut to desired shapes. To further increase the tensile strength of the structure, it can be sintered near the melting point of the PTFE in the range of 330° to 390° C. to accomplish sintering of the PTFE. Exact sintering conditions are provided by the manufacturers of PTFE.

As will be apparent to one skilled in the art, other methods of mechanically working a mixture of PTFE and appropriate filler materials may be employed and such methods are illustrated in U.S. Pat. No. 3,864,124 (e.g., ball milling, stretching, elongating, and the like). Moreover, the filler materials useful in the present invention encompass those materials mentioned in the aforesaid U.S. Pat. No. 3,864,124.

Gaskets are cut in configurations to match the sealing surfaces of the interface to be sealed. Ancilar rings with bolt holes are the most frequent configurations of gasket used.

Packings for sealing rotating shafts can be made by cutting or rolling the materials of this invention into strips, the diameter and length of which depend upon the diameter of shaft and size of packing cavity.

When in the unsintered state, materials of this invention form coherent, homogeneous structures when compressed. This phenomenon results in packing strips being converted into shear resistant, integral seals when compressed. Identity of individual strips is lost.

This reforming phenomenon also allows fabrication of seals and gaskets by compression molding. By this method the fibrillated materials of this invention are pelletized or chopped to give a free flowing material. This in turn is flowed into a die and compressed to desired shapes, either with or without heat depending upon properties required by the pressed part. At higher concentrations of PTFE, compression molding can be carried out under conditions approaching those used for compression molding PTFE. At lower concentration levels of PTFE, higher pressures are required — sometimes approaching those used for compressing metal and ceramic powders.

The reforming property of unsintered PTFE filler materials permits the fabrication of composite structures in which a reinforcing mesh such as screen is embedded with PTFE-filler materials. This is made by laminating the screen between two sheets of the unsintered gasket material by hot rolling. Mesh material can be made from filaments of metals such as stainless steel, glass or polymeric materials such as nylon or polyester. The size of the mesh is dependent upon the thickness of the laminated gasket thickness. Both woven and nonwoven meshes can be used. In general the thickness of the mesh should constitute over 50 percent of the total thickness of the gasket. Under compression by rolling the sheets of unsintered gasket material conform closely to and surround the screen to embed it within the resulting laminate, intimately contacting the screen with the sheets. After compression, and essentially unitary structure results with the screen completely embedded within the structure with no visible evidence of an interface between the two sheets which have been laminated.

EXAMPLE 1

A stainless steel-PTFE gasket was made by the following procedure: 64 grams of minus 325 mesh stainless steel powder was dry mixed with 4.4 grams of Teflon 6C manufactured by E. I. DuPont de Nemours & Co. in a two quart ball mill using ½ inch steel balls, for 30 minutes. The mixture was separated from the steel balls and hot rolled by the procedure previously described to form a sheet 0.031 inches thick.

A washer 2.06 inches OD and 1.30 inches ID was cut from this sheet. The washer was placed between two flat 3.00 inch diameter plattens and compressed at successively higher loads. For comparison, unreinforced, sintered PTFE sheet 0.030 inches thick was tested in the same manner. Results are tabulated below.

| Material | Load in Tons | % Reduction in Thickness |
|---|---|---|
| Stainless steel PTFE | 2 | 10 |
|  | 4 | 16 |
|  | 6 | 16 |
|  | 8 | 23 |
|  | 10 | 23 |
|  | 12 | 29 |
|  | 14 | 26 |
|  | 16 | 29 |
|  | 18 | 29 |
|  | 20 | 32 |
| PTFE (.030 inch initial thickness) | 2 | 10 |
|  | 4 | 13 |
|  | 6 | 23 |
|  | 8 | 23 |
|  | 10 | 30 |
|  | 12 | 37 |
|  | 14 | 37 |
|  | 16 | 40 |
|  | 18 | 43 |
|  | 20 | 43 |

These data show that at 12 tons load, particles of stainless steel interlocked and arrested further deformation of the gasket. The PTFE on the other hand continued to deform.

EXAMPLE 2

A PTFE-graphite material for sliding seals was prepared as follows: 17.6 grams of minus 325 mesh flake graphite and 4.4 grams of 6C Teflon were made into 0.070 thick sheet by the method described in Example 1. Rectangular pieces were placed between a flat metal block and a steel wheel 1 ⅜ inches in diameter with its face being 5/16 inch wide pressing the PTFE-graphite composite. A load of 90 lbs. was applied to the block and the wheel was rotated to give a sliding velocity of 12 ft./min. While operating, the dynamic coefficient of friction was determined from normal and tangential forces. The time required to wear through the PTFE-graphite composite was recorded. The results in comparison with commercial unreinforced PTFE and commercial glass reinforced PTFE evaluated in the same way are compared below:

| Material | Coefficient of Friction | Time to Failure |
|---|---|---|
| Sintered PTFE | .070 | 7 minutes |
| Glass filled PTFE | .071 | 21 minutes |
| Graphite-PTFE of this invention | .070 | 150 minutes |

This indicates that the graphite-PTFE structure had much greater resistance to wear than unfilled, sintered PTFE or glass filled PTFE while retaining a low coefficient of friction.

EXAMPLE 3

Eighteen grams of minus 325 mesh flake graphite, 4 grams of PTFE and 12 grams of Mobilplex 47 lubricating grease manufactured by Mobil Oil Company were ball milled as described in Example 1. This mixture was then mechanically worked by cross-rolling as described in Example 1. The sheet was rolled to 0.035 inch thickness and tested as described in Example 1. The results are tabulated below:

| Material | Load in Tons | % Reduction in Thickness |
|---|---|---|
| Graphite-PTFE with grease | 2 | 61 |
|  | 4 | 77 |
|  | 8 | 84 |
| PTFE | 2 | 5 |
|  | 4 | 15 |
|  | 8 | 18 |

The presence of the grease imparted a high degree of flowability under pressure compared to that of PTFE alone.

EXAMPLE 4

A structure containing 4 grams of PTFE, 18 grams of minus 50 mesh glass powder and 12 grams of grease (as in Example 3) was prepared by the method given in Example 3. The grease was removed by extraction for 60 minutes with a triethylene chloride solvent.

The resultant sheet was folded and then rolled at 90° C. down to 0.031 inch thickness. A tough, pliable sheet was produced.

When tested by the procedure given in Example 1, the following results were obtained:

| Material | Load in Tons | % Reduction in Thickness |
| --- | --- | --- |
| Glass-PTFE | 2 | 13 |
|  | 4 | 13 |
|  | 6 | 19 |
|  | 8 | 23 |
|  | 10 | 19 |
|  | 12 | 23 |
|  | 14 | 26 |
|  | 16 | 26 |
|  | 18 | 26 |
|  | 20 | 26 |
| PTFE (.030 inch initial thickness) | 2 | 10 |
|  | 4 | 13 |
|  | 6 | 23 |
|  | 8 | 23 |
|  | 10 | 30 |
|  | 12 | 37 |
|  | 14 | 37 |
|  | 16 | 40 |
|  | 18 | 43 |
|  | 20 | 43 |

EXAMPLE 5

A structure containing 4 grams of PTFE, 18 grams of minus 325 mesh glass powder and a sodium silicate solution made by Sauereisen Company in Pittsburgh, Pennsylvania and designated Sauereisen 14 was ball milled and rolled by the procedure given in Example 1. Care was taken to avoid drying by rolling between 60° and 90° C. The final thickness was 0.035 inch. The sheet was tough and pliable. A gasket was cut from this and clamped between two flanges. After 48 hours, the pliable gasket was transformed into a hard gasket that was made more resistant to compression flow by the setting up of the silicate solution.

The gasket and seal materials of the present invention are typically used to prevent or minimize the passage of a fluid medium through an interface or juncture of two surfaces. The fluid medium is normally a liquid and/or a gas, and the seal and gasket material serves to overcome the inability or lack of economics to machine the abutting surfaces to tolerances necessary for precise alignment which per se would prevent or minimize passage of the fluid medium. Alternatively, the gasket and seal materials are used where the desired tolerance cannot be maintained during use (e.g., where due to wear, the close tolerances cannot be maintained suitably close to prevent or minimize fluid medium passage).

In accord with the present invention, the surfaces to be sealed may be stationary with respect to one another or they may move relative to each other. Typical uses for the seals and gaskets of the invention include abrasion seals and compression seals in jet engines, pumps, motors, chemical process equipment, pistons, valves, flanges, pipes, vacuums, and the like. In the environment of use, the temperatures may vary greatly from below freezing to considerably above say up to 3100° F.

With respect to the sealing and gasketing materials, they normally are placed between the surfaces to be gasketed or sealed and the surfaces are then moved into their desired relationship and spacing which serves to compress the material and effect the desired sealing and gasketing.

Dendritic as employed in this application includes particles sufficiently irregular such that they interlock upon compression.

What is claimed is:

1. A self-sustaining, flexible, non-woven material consisting essentially of from about 65 to 95 percent by volume of a solid particulate material and from about 5 to 35 percent by volume of polytetrafluoroethylene resin, said volume percentages being based upon the amount of particulate material and polytetrafluoroethylene present, said particulate material being interconnected and intertwined by fibrils of said polytetrafluoroethylene to impart a self-sustaining condition and flexibility to the non-woven material, and additionally containing from about 40 to 60 percent by volume of the non-woven material to grease, said grease having a viscosity between about 10 to 1000 poises at temperatures between about 10 and 150° C. and being uniformly distributed throughout the non-woven material, said non-woven material having been prepared by mechanically working a mixture of said particulate material, polytetrafluoroethylene and grease until fibrillation of the polytetrafluoroethylene occurs and the resulting fibrils interconnect and intertwine the particulate material.

2. The material according to claim 1 which has been compressed, particulate material therein being interlocked whereby resistance to creep is increased.

3. The material according to claim 1 wherein the particulate material is graphite.

4. The material according to claim 1 wherein the particulate material is a metal, intermetallic compound, ceramic, salt, plastic or combinations thereof.

5. The material according to claim 1 wherein the grease comprises a mineral or synthetic lubricating oil and a thickening agent.

6. A method of making the nonwoven material according to claim 1 which comprises mechanically working a mixture of the particulate material, polytetrafluoroethylene and grease until fibrillation of the polytetrafluoroethylene occurs and the resulting fibrils interconnect and intertwine the particulate material to impart a self-sustaining condition and flexibility to the nonwoven material.

* * * * *